(12) United States Patent
Warner et al.

(10) Patent No.: US 12,711,201 B2
(45) Date of Patent: Aug. 18, 2026

(54) DATA SIMILARITY DETECTION

(71) Applicant: Collibra Belgium BV, Brussels (BE)

(72) Inventors: Eric C. Warner, Sandwich, MA (US); Kelsey C. Schuster, St. Louis, MO (US); Gretel De Paepe, Deux-Acren (BE); Anna M. Filipiak, Wroław (PL); Vicky Froyen, Kessel-Lo (BE)

(73) Assignee: Collibra Belgium BV, Brussels (BE)

( * ) Notice: Subject to any disclaimer, the term of this patent is extended or adjusted under 35 U.S.C. 154(b) by 8 days.

(21) Appl. No.: 18/948,348

(22) Filed: Nov. 14, 2024

(65) Prior Publication Data

US 2025/0165561 A1 May 22, 2025

Related U.S. Application Data

(60) Provisional application No. 63/563,944, filed on Mar. 11, 2024, provisional application No. 63/600,019, filed on Nov. 16, 2023.

(51) Int. Cl.
*G06F 18/22* (2023.01)
*G06F 16/215* (2019.01)
*H04L 9/32* (2006.01)

(52) U.S. Cl.
CPC ............ *G06F 18/22* (2023.01); *G06F 16/215* (2019.01); *H04L 9/3236* (2013.01)

(58) Field of Classification Search
CPC ....... G06F 16/215; G06F 18/22; H04L 9/3236
See application file for complete search history.

(56) References Cited

U.S. PATENT DOCUMENTS

2016/0147797 A1 5/2016 Dolph et al.
2019/0155572 A1* 5/2019 Misra .................... G06F 11/263
2021/0200745 A1* 7/2021 Bui ..................... G06F 16/2365
2022/0237205 A1 7/2022 Kamran et al.

OTHER PUBLICATIONS

Stojanović, Uglješa, "Identifying and extracting structured data from web pages", eRAF Journal on Computing, vol. 7, 2015. (Year: 2015).*
PCT/EP2024/082571 International Search Report and Written Opinion mailed Feb. 4, 2025, 17 pgs.

* cited by examiner

*Primary Examiner* — Jay A Morrison
(74) *Attorney, Agent, or Firm* — Ashurst Perkins Coie US LLP

(57) ABSTRACT

A computer-implemented method and system for comparing and analyzing similarities between database tables. The method includes receiving a database instance containing at least two tables with multiple rows and columns, performing irreversible hashing operations on selected data within specified rows and columns of both tables, conducting statistical comparisons between corresponding columns to determine table similarities, and displaying the comparison results through a graphical user interface. The system employs data transformation through one-way hashing techniques and statistical analysis to evaluate structural and content similarities between database tables, enabling efficient comparison of structured data sets while maintaining data security through irreversible hashing.

20 Claims, 8 Drawing Sheets

DATA SIMILARITY DETECTION

CROSS-REFERENCE TO RELATED APPLICATIONS

This Application claims the benefit under 35 U.S.C. § 119(e) of U.S. Provisional Patent Application No. 63/600,019, entitled "DATA SIMILARITY DETECTION" filed on Nov. 16, 2023 and U.S. Provisional Patent Application No. 63/563,944, entitled "DATA SIMILARITY DETECTION" filed on Mar. 11, 2024, both of which are herein incorporated by reference in their entireties.

BACKGROUND

The amount of data harvested, generated, and consumed is continuously growing every day. As a consequence, the data being ingested into data platform workflow instances keeps growing, leading to the possibility of similar or even duplicate data being stored. This continuous growth in data can pose challenges for data analysis processes to determine the data or datasets that are appropriate to answer their questions. Moreover, the continuous growth in data can also pose cost challenges for data storage. Storage of redundant data can increase operational costs by millions of dollars in storage costs. Furthermore, the presence of redundant data increases risks to privacy risks because personally identifiable information (PII) could potentially be copied and/or misused multiple times from different databases.

BRIEF DESCRIPTION OF THE DRAWINGS

Detailed descriptions of implementations of the present technology will be described and explained through the use of the accompanying drawings.

Figure 1:
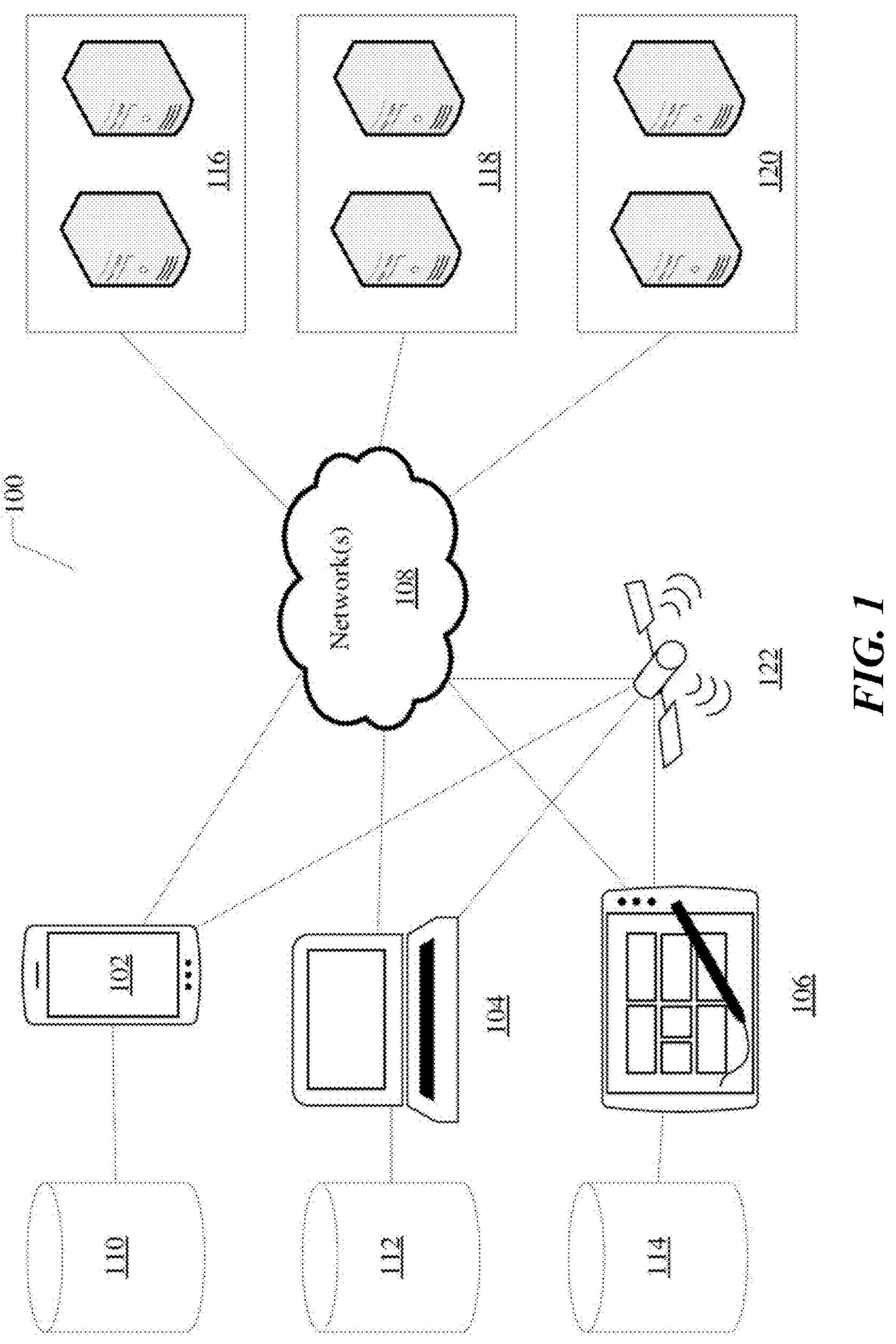
FIG. 1 is a block diagram that illustrates an example distributed system that can implement aspects of the present technology.

The technologies described herein will become more apparent to those skilled in the art from studying the Detailed Description in conjunction with the drawings. Embodiments or implementations are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The amount of data harvested, generated, and consumed is continuously growing every day. As a consequence, the data being ingested into data platform workflow instances keeps growing, leading to the possibility of similar or even duplicate data being stored. This continuous growth in data can pose challenges for data analysis processes to determine the data or datasets that are appropriate. Moreover, the continuous growth in data can also pose cost challenges for data storage. Storage of redundant data can increase operational cloud storage costs by millions of dollars. Furthermore, the presence of redundant data increases risks to privacy risks because personally identifiable information (PII) could potentially be copied and/or misused multiple times from different databases. Given the rapid growth of data assets compared to the disproportionate growth of data stewards within an organization, more efficient methods to detect similar and/or identical data structures, e.g., within data instances, are required.

This document discloses methods, systems, and apparatuses for determining similar or duplicate tables and datasets across different source systems. The disclosed implementations are sometimes referred to as a "Privacy Enhancing Technology." The methods can use profiling statistics, encrypted values, and summary sketches derived from the actual data to determine a similarity score. To distinguish between alternative datasets, the disclosed apparatuses can combine three data similarity metrics of the datasets to determine a total similarity score. The similarity score can be derived based on the amount that the datasets or tables are used across an enterprise. The similarity score can thus be based on the data's connectivity in a data intelligence graph. In some embodiments, the data similarity metrics and/or the amount that the datasets or tables are used across an enterprise are used to determine an importance score. In some embodiments, the importance score is similar to or the same as the similarity score.

In some implementations, a computer system receives a database instance containing at least two tables with multiple rows and columns, performing irreversible hashing operations on selected data within specified rows and columns of both tables, conducting statistical comparisons between corresponding columns to determine table similarities, and displaying the comparison results through a graphical user interface. The system employs data transformation through one-way hashing techniques and statistical analysis to evaluate structural and content similarities between database tables, enabling efficient comparison of structured data sets while maintaining data security through irreversible hashing.

In some implementations, a computer system ingests a data instance organized in accordance with at least one schema describing multiple data structures (e.g., tables) within the data instance. The multiple data structures include multiple data fields (e.g., rows and columns). The data instance includes multiple data values (e.g., letters, words, strings, integers, and/or floating-point values) stored within the multiple data fields. The multiple data values stored within the multiple data fields are irreversibly hashed. A query is received from a computer device requesting a similarity profile for the data instance. Responsive to receiving the query, a first similarity metric is determined based on data structure names (e.g., table names) of the multiple data structures. A second similarity metric is determined based on data field names (e.g., column names) of the multiple data fields. A third similarity metric is determined based on the irreversibly hashed multiple data values stored within the multiple data fields. The similarity profile is determined based on a weighted average of the first similarity metric, the second similarity metric, and the third similarity metric. The similarity profile for the data instance is sent to the computer device.

In some implementations, multiple data values are ingested from at least one computer device. The multiple data values are irreversibly hashed to generate hashed data. The hashed data is organized in accordance with multiple data structures. The multiple data structures include multiple data fields storing the hashed data. A first similarity metric is determined based on data structure names of the multiple data structures. A second similarity metric is determined based on data field names of the multiple data fields. A third similarity metric is determined based on the hashed data stored within the multiple data fields. A similarity profile of the hashed data is determined based on a weighted average of the first similarity metric, the second similarity metric, and the third similarity metric. The similarity profile of the hashed data is displayed on a graphical user interface of the computer system.

The technical benefits and advantages of the implementations described herein include the storage of only irreversibly hashed user data. For enhanced privacy, no raw user data is stored by the disclosed systems. The disclosed methods are able to scale as the size of user instances increases by avoiding pairwise comparisons between columns. The disclosed systems are able to determine whether columns or tables in user instances have similar names, whether the data stored in the columns is similar, and whether the distribution is similar in a reasonable amount of processing time via vectorized storage and lookup. For example, the disclosed methods can be performed on user instances having 700K columns in less processing time than conventional methods. The disclosed systems further provide better precision and recall results than conventional systems. The disclosed technology is also amenable to incorporating user feedback for rapid algorithmic improvements. In addition, by using machine learning architectures, such as k-Nearest Neighbors (k-NNs), MinHash, KLL sketches, and HashingTF, the disclosed implementations enable reduction of memory footprint and improvement in computational performance.

Operation of the disclosed systems as disclosed herein causes a reduction in greenhouse gas emissions compared to traditional datacenters for data storage. Every year, approximately 40 billion tons of $CO^2$ are emitted around the world. Power consumption by digital technologies including datacenters account for approximately 4% of this figure. For example, in the U.S., datacenters are responsible for approximately 2% of the country's electricity use, while globally they account for approximately 200 terawatt Hours (TWh). Storing 1 GB of data can produce approximately 3 kg of $CO^2$. Each GB of data downloaded thus results in approximately 3 kg of $CO^2$ emissions or other greenhouse gas emissions. The storage of 100 GB of data in the cloud every year produces approximately 0.2 tons of $CO^2$ or other greenhouse gas emissions. Further, conventional methods of data storage can sometimes exacerbate the causes of climate change. The implementations disclosed herein can mitigate climate change by reducing and/or preventing additional greenhouse gas emissions into the atmosphere. For example, by performing the disclosed methods on large user instances having hundreds of thousands of columns in less processing time than conventional methods as described herein reduces electrical power consumption and the amount of data transported and stored compared to traditional methods.

Using the embodiments disclosed for detecting data similarity herein reduces the amount of data transported and stored, and obviates the need for wasteful $CO^2$ emissions. In particular, by using the MinHash methods described herein, the disclosed systems provide increased data efficiency compared to traditional methods. Reducing storage of redundant data reduces carbon emissions associated with cloud storage. Therefore, the disclosed implementations, including the k-nearest neighbors algorithm, mitigates climate change and the effects of climate change by reducing the amount of data stored and downloaded in comparison to conventional data storage technologies for datacenters.

The description and associated drawings are illustrative examples and are not to be construed as limiting. This disclosure provides certain details for a thorough understanding and enabling description of these examples. One skilled in the relevant technology will understand, however, that the embodiments can be practiced without many of these details. Likewise, one skilled in the relevant technology will understand that the embodiments can include well-known structures or features that are not shown or described in detail, to avoid unnecessarily obscuring the descriptions of examples.

FIG. 1 is a block diagram that illustrates an example distributed system that can implement aspects of the present technology. Example system 100 presented is a combination of interdependent components that interact to form an integrated whole for consolidating and enriching data. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive and transmit data. For example, client devices 102, 104, and 106 may contain client-specific data. Client devices may download a third-party tokenization software program via network(s) 108 that may be applied to the client-specific data. The client-specific data may be stored in local databases 110, 112, and 114. Once tokenized, the client-specific data is transformed into "tokens," and these tokens may be transmitted via network(s) 108 and/or satellite 122 to server(s) 116, 118, and/or 120. Server(s) 116, 118, and/or 120 may be third-party servers owned by a Consolidation Platform. In other examples, client-specific data may be stored in servers (in addition to or instead of local client devices and local databases) and may be tokenized and then transmitted from client servers to third-party servers via network(s) 108 and/or satellite 122.

In aspects, a client device, such as client devices 102, 104, and 106, may have access to one or more datasets or data sources and/or databases comprising client-specific data. In other aspects, client devices 102, 104, and 106, may be equipped to receive broadband and/or satellite signals carrying client-specific tokens or unencrypted data (or a mixture of both). The signals and information that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a mobile phone, a laptop computer, a tablet, a smart home device, a desk phone, and a wearable (e.g., a smart watch), among other devices.

In some examples, the server devices 116, 118, and/or 120 may be configured to run data similarity profiling software on certain datasets. Specifically, the server devices 116, 118, and/or 120 may be configured to irreversibly hash data values, received from the client devices 102, 104, and/or 106, to generate hashed data organized in accordance with data structures including data fields. The server devices 116, 118, and/or 120 can determine a first similarity metric based on data structure names (e.g., tables names) of the data structures (e.g., tables). An example of similarity scores 312 is illustrated and described in more detail with reference to FIG. 3.

A second similarity metric can be determined based on data field names (e.g., column names) of the data fields (e.g., columns). A third similarity metric can be determined based on the hashed data stored within the data fields. A similarity profile of the hashed data can be determined based on a weighted average of the first similarity metric, the second similarity metric, and the third similarity metric. The output of the data similarity profiling software may be the similarity profile of the hashed data and files suitable to be consumed by a database loading process. The hashed data and/or database may be stored on local storage 110, 112, and/or 114, or remote storage device(s) 116, 118, and/or 120. The separate files may be loaded into a database loader and may persist the database-ready files across a database.

In some instances, local database(s) 110, 112, and/or 114, and remote data store(s) 116, 118, and/or 120 may be PostgreSQL (aka "postgres") databases, where multiple sources of data may be stored. Cross-source matching may occur within the PostgreSQL database(s), and an entity merge processor may run recursive database functions to merge token entities with similar token attributes.

The procedure for tokenizing and transmitting data from the Customer-side and the Reference Source-side may be similar, in that the data may be stored locally initially and subsequently hashed and encrypted on the Customer-owned and/or Reference Source-owned client devices and, once in tokenized form, finally transmitted to third-party servers for analysis, consolidation, and enrichment, among other actions. In other words, FIG. 1 depicts a network topology that may be used in a Customer Environment and/or Reference Source Environment (i.e., client devices 102, 104, and/or 106 may belong to the Client Environment in one example and belong to the Reference Source Environment in another example).

Figure 2:
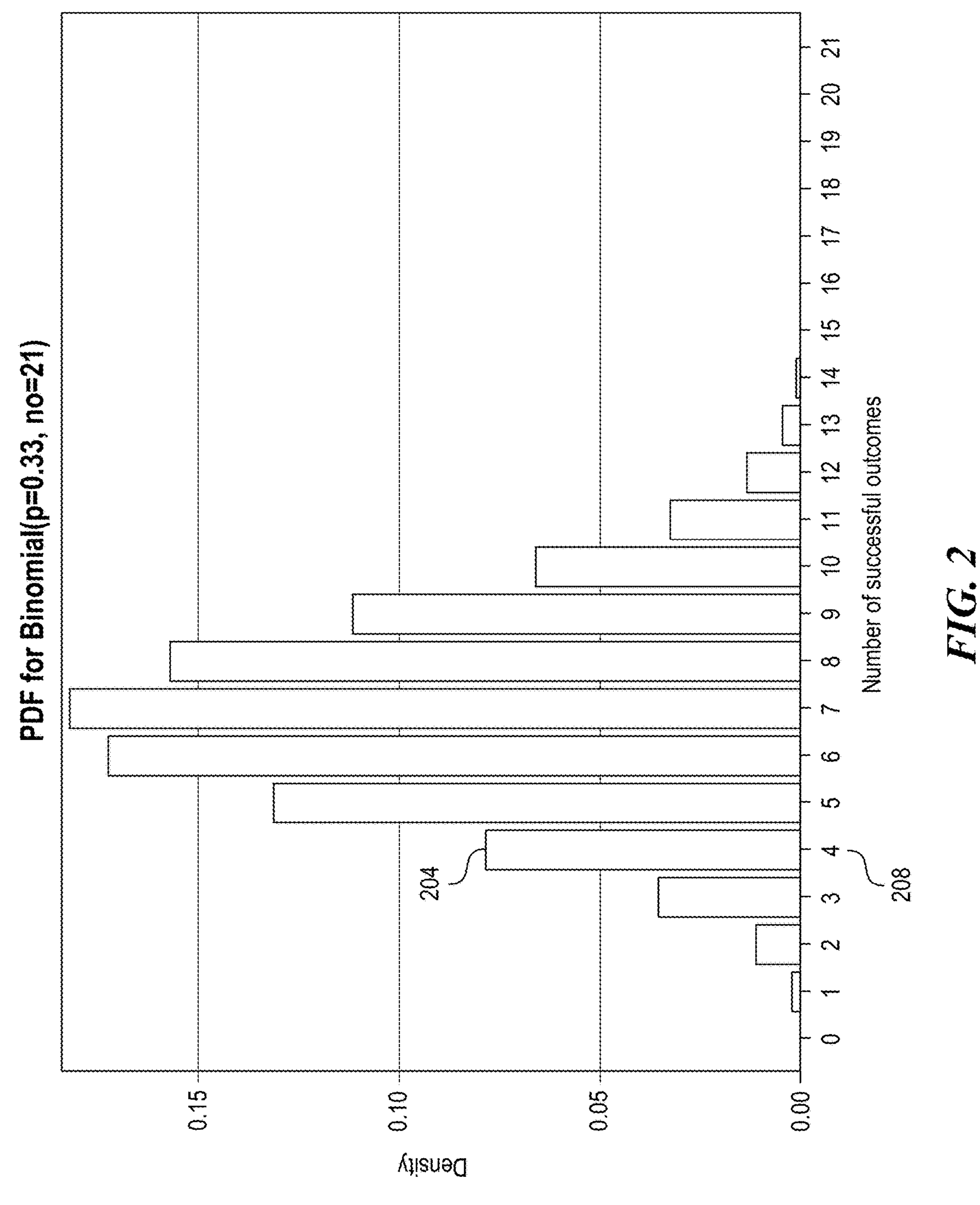
FIG. 2 is a drawing that illustrates a discrete probability distribution according to aspects of the present technology.

FIG. 2 is a drawing that illustrates a discrete probability distribution 200 according to aspects of the present technology. In some implementations, a computer system ingests a data instance organized in accordance with multiple data structures. The computer system can be the system 100 illustrated and described in more detail with reference to FIG. 1.

Figure 7:
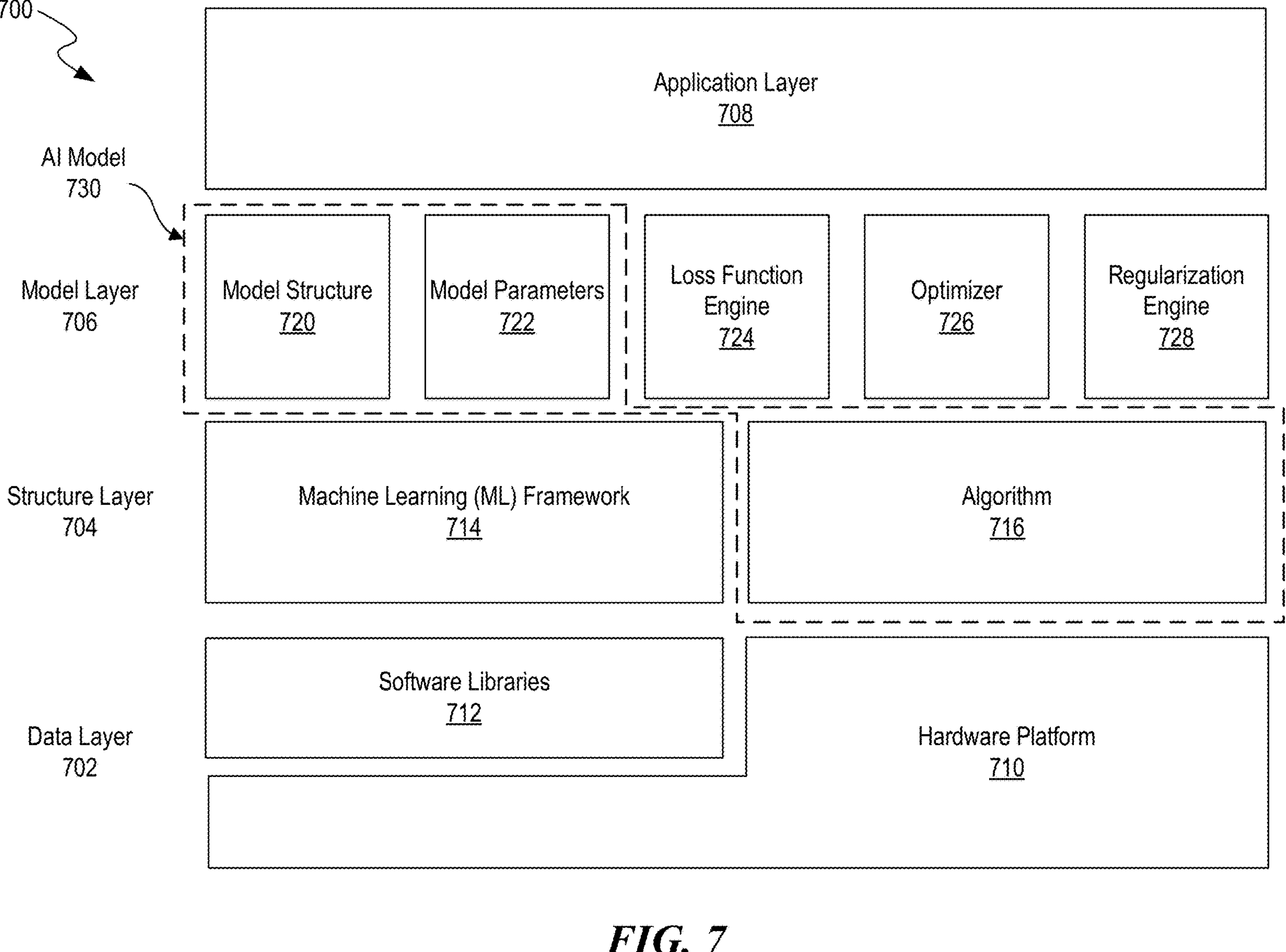
FIG. 7 is a block diagram that illustrates an example artificial intelligence (AI) system that can implement aspects of the present technology.

A data instance is a collection of data organized in accordance with at least one schema describing multiple data structures within the instance, wherein the data structures include multiple data fields storing data values of various types including but not limited to letters, words, strings, integers, and/or floating-point values, and wherein the data instance can represent configuration data for a cloud instance or data specific to an object instance of a class. An example data instance 700 and example data structures 704*a-b* are illustrated in FIG. 7. Data ingestion is described in more detail with reference to FIG. 4. The multiple data structures include multiple data fields. Example data fields 708*a-b* are illustrated in FIG. 7. Data structures and data fields are described in more detail with reference to FIG. 4. The data instance includes multiple data values stored within the multiple data fields. Example data values 712*a-b* are illustrated in FIG. 7.

In some embodiments, the computer system irreversibly hashes the multiple data values stored within the multiple data fields. Irreversible hashing is described in more detail with reference to FIG. 4. The irreversible hashing can be performed using a MinHash algorithm. MinHash is a method for estimating how similar two sets are. It can be used, for example, to detect duplicate web pages and eliminate them from search results. The irreversible hashing can be performed using a Locality Sensitive Hashing (LSH) index. LSH is described in more detail with reference to FIG. 4. The irreversible hashing can be performed using HashingTF to produce a discrete probability distribution, for example, the probability distribution 200 illustrated in FIG. 2. HashingTF converts integers into a discrete probability distribution, where the bins 208 within the distribution are encrypted (rather than raw data) and the values 204 are normalized distribution values. The irreversible hashing can be performed using KLL Sketch. KLL Sketch is a method used for floating point vales and can be used to generate an approximate quantile sketch of a continuous distribution. KLL Sketch also works on streaming data, i.e., data that is not received at once in entirety but in batches.

The system employs different hashing techniques based on the data type being processed. For string, date, and categorical data, the system uses the MinHash algorithm, which is a method for estimating how similar two data sets are. For integer data, the system utilizes HashingTF to convert integers into a discrete probability distribution, where the bins 208 within the distribution contain encrypted values and normalized distribution values. For floating point values, the system employs KLL Sketch to generate an approximate quantile sketch of a continuous distribution, with noise added for enhanced privacy. Prior to hashing, numeric fields are formatted into scientific notation before being cast to strings, date and time fields are converted to Unix dates before being cast to strings, and Boolean fields are cast to strings as is. This preprocessing ensures consistent handling across data types while maintaining statistical properties needed for similarity detection. The hashing process is designed to be one-way (irreversible) to enhance privacy, as no raw user data is stored by the system.

In some embodiments, a bag of words method is used instead of LSH. The bag-of-words model is a model of text represented as an unordered collection of words. It can be used to disregard grammar and word order but keep multiplicity. For example, the bag-of-words model is used in scenarios where the (frequency of) occurrence of each word is used as a feature for training a classifier. Classifiers are described in more detail with reference to FIG. 5. In some embodiments, a bag of words method is used to represent text data when modeling text with machine learning algorithms. The embodiments build vocabulary of known words and a measure of the presence of known words. Information about the order or structure of words in the document is discarded. The model is only concerned with whether known words occur in the document, not where in the document. The benefits are that columns are similar if they have similar content.

The computer system identifies a subset of the multiple data structures by determining a data structure name similarity of the subset of the multiple data structures. Example data structure names 716*a-b* are illustrated in FIG. 7. The data structure name similarity refers to how similar the names of the data structure are, e.g., on a scale of 0-1 or 0-100%. In some implementations, each of the multiple data structures is a table and/or each of the multiple data fields is a column. An example of similarity scores 312 is illustrated and described in more detail with reference to FIG. 3.

The computer system can determine a data field name similarity of the subset of the multiple data structures based on the multiple data fields. Example data field names 720*a-b* are illustrated in FIG. 7. The data field name similarity refers to how similar the names of the data fields are, e.g., on a scale of 0-1 or 0-100%. The computer system can determine a data field similarity of the subset of the multiple data structures based on the irreversibly hashed multiple data values. The data field similarity refers to how similar the content of the data fields are, e.g., on a scale of 0-1 or 0-100%. The computer system can determine a weighted average of the data structure name similarity, the data field name similarity, and the data field similarity. To identify whether the subset of the multiple data structures are similar enough or are duplicates, the computer system determines whether the weighted average is greater than a threshold data similarity. The threshold can be 0.7, 0.8, or 0.9 on a scale of 0-1. The threshold can be 70%, 80%, or 90% on a scale of 0-100%.

The threshold data similarity value is used to identify whether data structures are similar enough or are duplicates. The threshold can be configured as 0.7, 0.8, or 0.9 on a scale of 0-1, or equivalently as 70%, 80%, or 90% on a scale of 0-100%. When determining similarity between tables, the system calculates a weighted average combining table name similarity (10%), column name similarity (20%), and column content similarity (70%). If this weighted average exceeds the configured threshold, the tables are considered significantly similar or potential duplicates. The threshold approach helps optimize computational resources and processing time by avoiding exhaustive pairwise comparisons between columns, instead utilizing vectorized storage and lookup methods for scalable performance. The system can be configured to return up to five similar table assets when the similarity score exceeds the defined threshold.

An example of generating the weighted average is that 70% of the weighted average (similarity score) is based on column content similarity (data field similarity). 20% of the similarity score is based on column name similarity (data structure name similarity). And, 10% of the similarity score is based on table name similarity (data field name similarity). This example weighting schema can be updated over time as feedback from users is gathered. The computer system sends information describing the subset of the multiple data structures to a computer device. The computer device can be part of the computer system or an external device. The computer device can be client devices 102, 104, and 106 or server devices 116, 118, and/or 120 illustrated and described in more detail with reference to FIG. 1.

Figure 3:
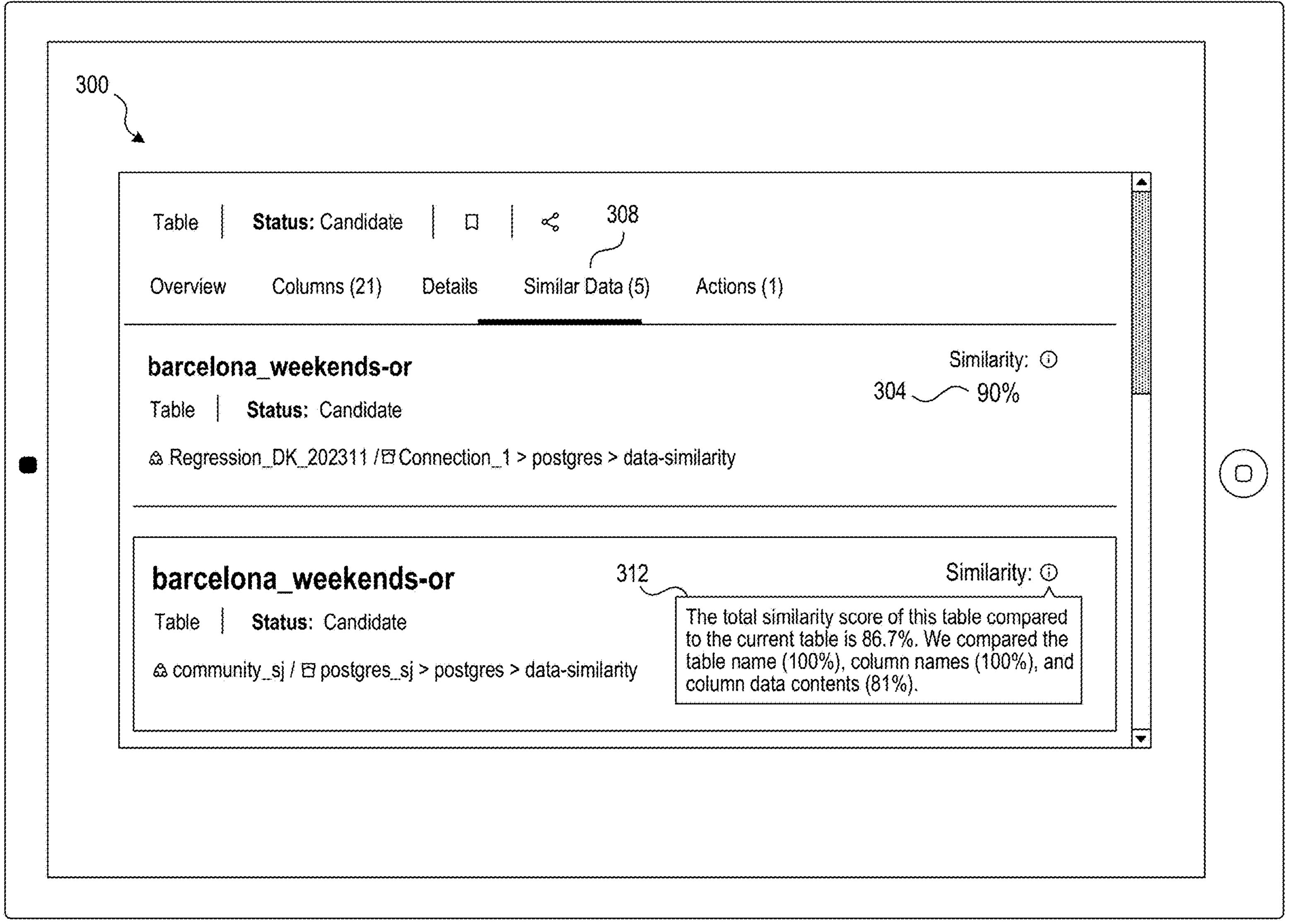
FIG. 3 is a drawing that illustrates an example output according to aspects of the present technology.

FIG. 3 is a drawing that illustrates an example output 300 or user interface according to aspects of the present technology. FIG. 3 shows similarity comparisons between database tables. The interface displays a table preview with multiple tabs including Overview, Columns, Details, Similar Data 308, and Actions. The interface shows similarity scores 312 between compared tables, where the similarity scores are presented as percentages. For example, one table shows a 90% similarity score 304. The interface includes a description area that explains the total similarity score calculation, indicating it is based on comparing table names, column names, and column data contents. The interface provides a clear visual representation of how similar different tables are to each other, with the similarity scores helping users quickly identify and evaluate potential matches. The display includes multiple table entries with their respective similarity scores and associated metadata like status and certification level.

In some implementations, a computer system irreversibly hashes multiple data values received from at least one computer device to generate hashed data. The computer system can be system 100 illustrated and described in more detail with reference to FIG. 1. Example data values 712*a-b* are illustrated in FIG. 7. The computer device can be part of the computer system or an external device. The computer device can be client devices 102, 104, and 106 or server devices 116, 118, and/or 120 illustrated and described in more detail with reference to FIG. 1. The hashed data is organized in accordance with multiple data structures including multiple data fields storing the hashed data. An example data instance 700 and example data structures 704*a-b* are illustrated in FIG. 7. Example data fields 708*a-b* are illustrated in FIG. 7. Data structures and data fields are described in more detail with reference to FIG. 4.

In some implementations, the computer system receives a query identifying a first data structure (e.g., a first table) and a second data structure (e.g., a second table) of the multiple data structures. For example, the query requests the computer system to determine how similar the first data structure and second data structure are. The query can be from the computer device or another computer system. The computer system can determine a data structure name similarity between the first data structure and the second data structure. The data structure name similarity refers to how similar the names of the data structure are, e.g., on a scale of 0-1 or 0-100%. Example data structure names 716*a-b* are illustrated in FIG. 7.

The computer system can determine a data field name similarity between the first data structure and the second data structure based on the multiple data fields. Example data field names 720*a-b* are illustrated in FIG. 7. The data field name similarity refers to how similar the names of the data fields are, e.g., on a scale of 0-1 or 0-100%. In some implementations, the computer system determines the data structure name similarity and the data field name similarity using fuzzy name matching. Fuzzy matching, also known as fuzzy logic, approximate string matching, fuzzy name matching, or fuzzy string matching is an artificial intelligence and machine learning technology that identifies similar, but not identical elements in data table sets.

The computer system can determine a data field similarity between the first data structure and the second data structure based on the irreversibly hashed multiple data values. The data field similarity refers to how similar the content of the data fields are, e.g., on a scale of 0-1 or 0-100%. The data field similarity can be determined using quantile embedding. For example, quantile layers return an estimate of the distribution of values for each learned filter across the sequence. Instead of a fixed-length vector representation of an instance, the embedding of an instance can be determined by these sets of distributions. In some implementations, prior to determining the data field similarity, the computer system formats (the data values in) numeric fields of the multiple data fields in scientific notation. Scientific notation is a way of expressing numbers that are too large or too small to be conveniently written in decimal form, since to do so would require writing out an inconveniently long string of digits. The computer system can format date and time fields of the multiple data fields as Unix dates. The data values in the numeric fields and the date and time fields are then converted into strings for processing. Boolean fields can be converted into strings as is.

The computer system can determine a weighted average of the data structure name similarity, the data field name similarity, and the data field similarity. The weighted average indicates how similar the first data structure and second data structure are. In response to the query, the computer system sends the weighted average to the at least one computer device. In some embodiments, to determine performance metrics such as Precision and Recall, the computer system creates a test dataset to help baseline performance of table similarity. To create this test dataset, the computer system adds tables to the dataset in the following ways. First, sampling from the tables can be performed with a sampling ratio varying between 70% and 90% of the original table. The sampling is done on the row level and also on the column level. Noise is added at random. Second, synthetic versions of the tables are created, where possible, using proprietary data.

For example, (1) table A in the dataset sampled on rows (with or without noise), (2) table A in the dataset sampled on columns (with or without noise), and (3) a synthetic version of table A are the desired similar results using the methods disclosed herein. In this example, when the 3 nearest neighbors of table A are queried for, the three alternative copies (1)-(3) described should be returned. That would result in 100% Recall and perfect Precision. If on the other hand, only one out of these three and two other dissimilar tables are returned, the Precision and Recall would drop to 0.33 each.

The k-nearest neighbors algorithm is implemented as a non-parametric supervised learning method for determining data field similarity between tables. For example, if Table A has five columns, the system finds the Nearest Neighbors to each column. If columns of Table B are part of the set of nearest neighbors in four of the five columns, the system declares Table B column content to be 80% similar to Table A. The algorithm uses vector storage and lookup methods rather than exhaustive pairwise comparisons between columns to maintain scalability. When processing numeric data fields, the system employs k-NN to identify similar columns by comparing the distribution of data values rather than exact matches. The k-NN implementation works in conjunction with the HashingTF algorithm for integer fields and KLL Sketch for floating point values to preserve numerical distribution properties while taking advantage of the discrete nature of the data. The system can be configured to return a specified number of nearest neighbors, typically up to 5 similar table assets when the similarity score exceeds the defined threshold.

In some implementations, the computer system identifies a first data structure (e.g., 704*a* of FIG. 7) that is a duplicate of a second data structure (e.g., 704*b* of FIG. 7). The second data structure is removed from the hashed data to generate reduced hashed data. Storing the reduced hashed data causes a reduction in greenhouse gas emissions compared to storing the hashed data. Each GB of data downloaded can result in approximately 3 kg of $CO^2$ emissions or other greenhouse gas emissions. The storage of 100 GB of data in the cloud every year produces approximately 0.2 tons of $CO^2$ or other greenhouse gas emissions. Using the embodiments disclosed for detecting data similarity herein reduces the amount of data transported and stored, and obviates the need for wasteful $CO^2$ emissions.

In some implementations, the similarity scores can be different when comparing a first table (Table A) to a second table (Table B), and then comparing Table B to Table A. The reason is that Data Similarity is not symmetrical. When Table A is found to be 90% similar to Table B, Table B will not necessarily be 90% similar to Table A. In some examples, Table A has two columns and Table B has four columns. Both columns in Table A have similar columns in Table B. Table A is 100% contained in Table B, but Table B is only 50% contained in Table A. In this schema, Table A would be 100% similar to Table B, and Table B would be 50% similar to Table A.

In some examples, even when Tables A and B have the same number of columns, the similarity scores could be different when comparing Table A to Table B, and then Table B to Table A for two reasons. First, the random noise in data values could be different. Second, the nearest neighbors of Table A are not necessarily the nearest neighbors of Table B.

Figure 4:
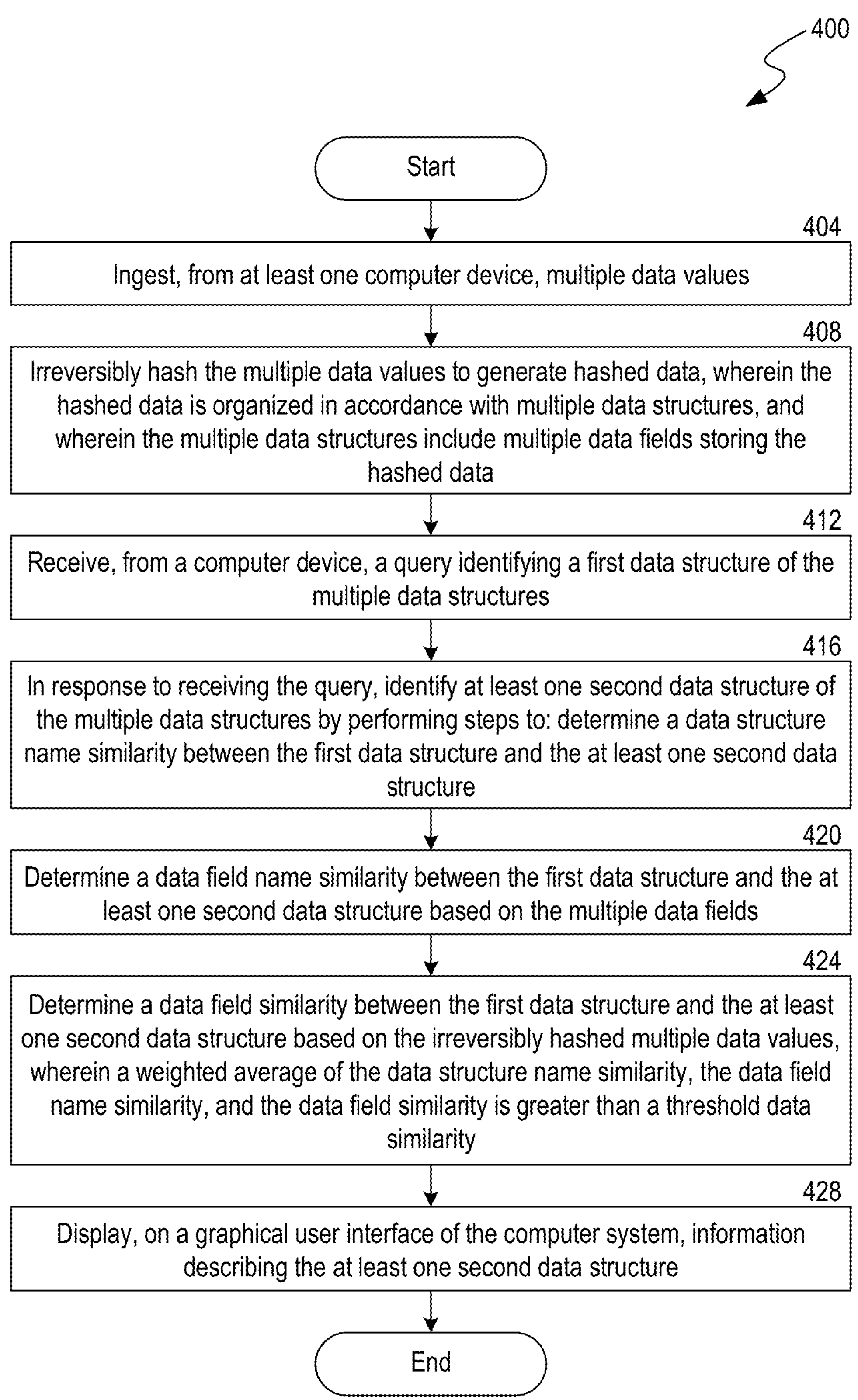
FIG. 4 is a flow diagram that illustrates an example process according to aspects of the present technology.

FIG. 4 is a flow diagram that illustrates an example process according to aspects of the present technology. In some implementations, the process is performed by the system 100 illustrated and described in more detail with reference to FIG. 1. In some implementations, the process is performed by a computer system, e.g., example computer system 600 illustrated and described in more detail with reference to FIG. 6. Particular entities, for example, AI system 500, perform some or all of the steps of the process in other implementations. The AI system 500 is illustrated and described in more detail with reference to FIG. 5. Likewise, implementations can include different and/or additional steps or can perform the steps in different orders.

In act 404, a computer system ingests multiple data values from at least one computer device. The computer device can be one of the client devices 102, 104, and 106 or one of the server devices 116, 118, and/or 120 illustrated and described in more detail with reference to FIG. 1. Data ingestion is the process of importing large, assorted data files from multiple sources into a single, cloud-based storage medium—a data warehouse, data mart or database—where it can be accessed and analyzed.

In act 408, the computer system irreversibly hashes the multiple data values to generate hashed data. The multiple data values can be integers, strings, floating point values, etc. For example, as in pseudonymization, the hash process is irreversible (referred to as a one-way hash). It is not possible to reverse the output of the function into the original input. In some implementations, the computer system profiles the multiple data values prior to irreversibly hashing the multiple data values. In some implementations, the ingesting and hashing process are part of the profiling process. When profiling the data, the computer system examines the multiple data values and generates and/or collects statistics or informative summaries about the multiple data values. In some implementations, the profiling is performed on the hashed data after the irreversible hashing.

In some implementations, the data is ingested and hashed at a computer device (e.g., a first computer server(s)) and then transferred to a different computer device (e.g., another computer server(s)) where the hashed data is stored. The hashing can be performed during a profiling process, which generates metadata on a threshold number of rows (e.g., a maximum of 10,000 rows of relational databases stored on the first computer server(s). The implementations disclosed herein avoid the need to receive/store raw data samples, which would impact data privacy. Since the data is created at the time of profiling, additional data to be collected can be added into the profiler repo, such as MinHashes. The data collected and stored is thus following the process already in place for the profiler, including when this is triggered and how the data is read/processed on the user side. The implementations disclosed herein scale with increases in size of the data instances.

The hashed data is organized in accordance with multiple data structures. Each of the multiple data structures has a name, which can be a string, a floating point value, or an integer. The multiple data structures include multiple data fields storing the hashed data. Each of the multiple data fields has a name, which can be a string, a floating point value, or an integer. Each data structure is a data organization, management, and storage format chosen for efficient access to the hashed data. Each data structure can be an array, a table, a linked list, a record, a hash table, a graph, a stack, a queue, a tree, or a trie. Each data field is a location for a predetermined type of data that—collectively with other data fields—describes the place it is stored. The most common example is a column in a data table that describes the row with which it intersects, and others include blocks in a blockchain or class variables in programming languages such as Java.

To aggregate data fields (e.g., columns) into data structures (e.g., tables), the computer system takes the intersection of the tables to which the nearest neighbor columns belong. The tables to which at least N % (e.g., 50% or 75%) of the nearest neighbor columns belong are identified. The tables to which the nearest neighbor columns belong are ranked based on the number of times they appeared in the column results. In some implementations, the top N (e.g., 6) are returned. A union of the tables to which the nearest neighbor columns belong is determined. Other implementations aggregate data fields into data structures in different ways, merging, concatenation, and/or generating a cross-product.

In some implementations, the computer system stores the hashed data using key-value storage. Key value databases, also known as key value stores, are database types where data is stored in a "key-value" format and optimized for reading and writing the data. The data is fetched by a unique key or a number of unique keys to retrieve the associated value with each key. Irreversibly hashing the multiple data values is performed using a Locality Sensitive Hashing (LSH) index on the key-value storage. LSH is a fuzzy hashing technique that hashes similar input items into the same "buckets" with high probability. The number of buckets is smaller than the universe of possible input items. Since similar items end up in the same buckets, this technique can be used for data clustering and nearest neighbor search. It differs from conventional hashing techniques in that hash collisions are maximized, not minimized. Alternatively, the technique can be seen as a way to reduce the dimensionality of high-dimensional data; high-dimensional input items can be reduced to low-dimensional versions while preserving relative distances between items.

In act 412, the computer system receives a query from a computer device identifying a first data structure of the multiple data structures. The query can include a data structure name of the first data structure, a pointer to the first data structure, an index of the first data structure, any other manner of indicating the first data structure, or a combination thereof. For example, the query can include a name of a table. The query can be from a user requesting the computer to identify similar data structures to the first data structure.

In act 416, in response to receiving the query, the computer system identifies at least one second data structure of the multiple data structures. In some implementations, the computer system stores the hashed data within a vector store for identifying the at least one second data structure. The vector store is a type of database that stores data as high-dimensional vectors, which are mathematical representations of features or attributes. Each vector has a certain number of dimensions, which can range from tens to thousands, depending on the complexity and granularity of the data. The vectors are usually generated by applying some kind of transformation or embedding function to the raw data, such as text, images, audio, video, and others. The embedding function can be based on various methods, such as machine learning models, word embeddings, feature extraction algorithms.

The second data structures are similar to (i.e., store similar data as) the first data structure. To identify the second data structures, the computer system determines a data structure name similarity between the first data structure and the at least one second data structure. That is, the computer system determines how similar the names of the first data structure and the at least one second data structure are. In some implementations, the computer system determines the data structure name similarity using an N-gram tokenizer. The N-gram tokenizer breaks text down into words when it encounters one of a list of specified characters, then it emits N-grams of each word of the specified length. N-grams are similar to a sliding window that moves across the word-a continuous sequence of characters of the specified length. The N-gram tokenizer is useful for querying languages that don't use spaces or that have long compound words, such as German.

In act 420, the computer system determines a data field name similarity between the first data structure and the at least one second data structure based on the multiple data fields. That is, the computer system determines how similar the names of data fields in the first data structure are to names of data fields in the second data structures based on the names of the multiple data fields. In some implementations, the computer system determines the data field name similarity using an N-gram tokenizer.

In act 424, the computer system determines a data field similarity between the first data structure and the at least one second data structure based on the irreversibly hashed multiple data values. That is, the computer system determines how similar the hashed data values in the first data structure are to the hashed data values in the second data structures. The computer system determines a weighted average (sometimes referred to as a similarity metric or similarity score) of the data structure name similarity, the data field name similarity, and the data field similarity. The computer system determines whether the weighted average is greater than a threshold data similarity. For example, the threshold data similarity is 70%, 80%, or 90%.

In some implementations, the computer system determines the data field similarity using Jaccard Similarity. Jaccard Similarity is a proximity measurement used to compute the similarity between two objects, such as two text documents. Jaccard Similarity can be used to find the similarity between two asymmetric binary vectors or to find the similarity between two sets. In some implementations, the computer system determines the data field similarity using a k-nearest neighbors (k-NN) approach. The k-NN approach is a non-parametric supervised learning method used for classification and regression. The input includes the k closest training examples in a data set For example, if a Table A has five columns, the Nearest Neighbors to each column are determined. If columns of a Table B are part of the set of nearest neighbors in four of the five columns, the Table B column content is 80% similar to Table A. The AI System 500 illustrated and described in more detail with reference to FIG. 5 can be used to perform the k-NN approach.

In act 428, the computer system displays information describing the at least one second data structure on a graphical user interface of the computer system. The graphical user interface can be displayed on display device 618 illustrated and described in more detail with reference to FIG. 6.

Figure 5:
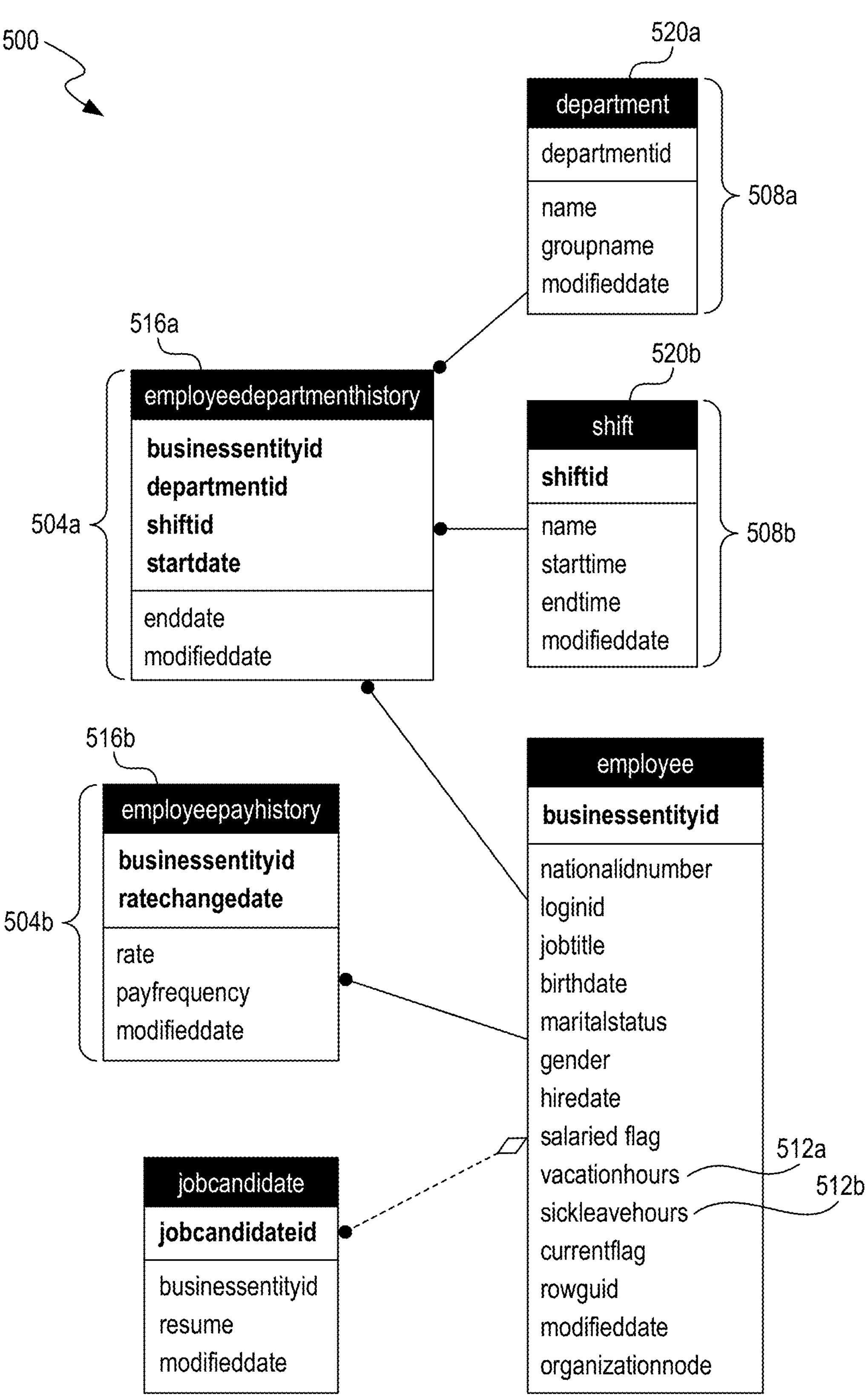
FIG. 5 is a block diagram that illustrates an example data instance according to aspects of the present technology.

FIG. 5 is a block diagram that illustrates an example data instance 500 according to aspects of the present technology. The data instance 500 includes example data structures 504_a-b_ and example data fields 508_a-b_. The data instance 500 includes example data values 512_a-b_ stored within the multiple data fields.

The names of the data structures 504_a-b_ are 516_a-b_, respectively, and can be used for determining data structure name similarity between tables. The names of the data fields 508_a-b_ are 520_a-b_, respectively, and can be used for determining data field name similarity between tables. The data structures 504_a-b_ can be tables containing rows and columns for organizing the data values. The data fields can be columns or rows within the tables that store specific types of data values. In some implementations, the data instance 500 includes a collection of configuration data for a cloud instance or data specific to an object instance of a class. The data instance can be organized according to at least one schema describing the multiple data structures and data fields within the instance. The data values stored within the data fields can include various types like letters, words, strings, integers, and/or floating-point values that can be irreversibly hashed for similarity comparisons.

Figure 6:
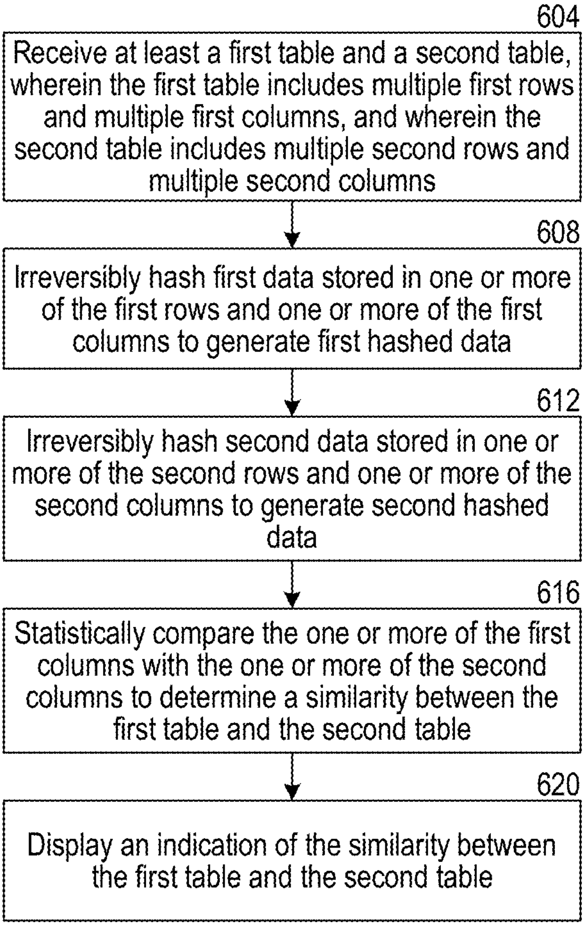
FIG. 6 is a flow diagram that illustrates an example process according to aspects of the present technology.

FIG. 6 is a flow diagram that illustrates an example process according to aspects of the present technology. In some implementations, the process is performed by the system 100 illustrated and described in more detail with reference to FIG. 1. In some implementations, the process is performed by a computer system, e.g., example computer system 800 illustrated and described in more detail with reference to FIG. 8. Particular entities, for example, artificial intelligence (AI) system 700, perform some or all of the steps of the process in other implementations. The AI system 700 is illustrated and described in more detail with reference to FIG. 7. Likewise, implementations can include different and/or additional steps or can perform the steps in different orders.

At 604, a computer system receives an instance of a database including at least a first table and a second table. The first table includes multiple first rows and multiple first columns, and the second table includes multiple second rows and multiple second columns. The database instance is organized in accordance with at least one schema describing multiple data structures (e.g., tables) within the data instance. The database instance contains at least two distinct tables, with each table containing multiple rows and columns that form the data fields. The computer system can include processors, memory, and other hardware components configured to handle database operations and ingest the data instance. The received database instance undergoes profiling as part of the ingestion process, which prepares the data for subsequent similarity analysis operations. The system is designed to efficiently process and ingest large-scale database instances that may contain hundreds of thousands of columns while maintaining performance. The ingestion process is implemented to operate on customer hardware infrastructure and serves as the foundation for the data similarity detection processes that will analyze and compare both the structural elements and content between the tables. The computer system can store the received database instance in memory for processing, enabling access to both the data structures and their constituent fields for subsequent analysis operations.

At 608, the computer system irreversibly hashes first data stored in one or more of the first rows and one or more of the first columns to generate first hashed data. For example, the computer system irreversibly hashes data values stored within specified rows and columns of the first table to generate first hashed data. The irreversible hashing can be performed using multiple techniques depending on the data type: MinHash algorithm for string/date/categorical data, HashingTF for integer data which converts integers into a discrete probability distribution, and KLL Sketch for floating point values which generates an approximate quantile sketch of a continuous distribution. The hashing process is designed to be one-way (irreversible) to enhance privacy, as no raw user data is stored by the system. Prior to hashing, numeric fields can be formatted into scientific notation and date/time fields can be converted to Unix dates. The irreversible hashing serves to compress the data while maintaining statistical properties needed for similarity detection. This hashing approach enables efficient comparison of structured datasets while ensuring data security through the one-way transformation process. The hashed data is then stored in a vector store, such as Elasticsearch, for subsequent similarity analysis operations.

At 612, the computer system irreversibly hashes second data stored in one or more of the second rows and one or more of the second columns to generate second hashed data. In implementations, the computer system irreversibly hashes data values stored within specified rows and columns of the second table to generate second hashed data. Similar to the first table's hashing process, the irreversible hashing of the second table's data can be performed using multiple techniques based on the data type: MinHash algorithm for string and categorical values, HashingTF for integer values to generate discrete probability distributions, and KLL Sketch for floating point values to create approximate quantile sketches. Prior to hashing, the system formats numeric fields in the second table into scientific notation and converts date/time fields to Unix dates. The hashing process maintains statistical properties while compressing the data, enabling efficient comparison between tables. No raw data from the second table is stored by the system, as the hashing process is one-way (irreversible) to enhance privacy and security. The second table's hashed data is stored in a vector store, such as Elasticsearch, alongside the first table's hashed data for subsequent similarity analysis.

In implementations, the computer system processes a limited subset of rows from each table to maintain efficiency and performance. The system can sample from the tables with a sampling ratio, where the sampling is performed on both the row level and column level. The sampling ratio can vary between 70 and 90 percent of the original table's rows. This row-level sampling ensures that the number of rows processed from each table remains below a configured threshold (e.g., 10,000 rows, 50,000 rows, 100,000 rows), enabling the system to efficiently process and compare large database instances while maintaining accuracy in similarity detection. The threshold approach to row sampling helps reduce the computational resources used and processing time while still preserving sufficient data for meaningful statistical comparisons between tables.

At 616, the computer system statistically compares the one or more of the first columns with the one or more of the second columns to determine a similarity between the first table and the second table. In some implementations, the hashing process described herein is used to encode statistical properties of the data as part of the embedding for each column. Therefore, the statistical properties of the data in the columns are compared when the similarity metrics are determined. Such implementations enable higher precision and recall for statistically similar columns. When there are many columns to compare between tables, the disclosed implementations provide suggestions of duplicate tables.

In implementations, the computer system statistically compares the selected columns between the first and second tables to determine their similarity. The comparison process can include combining three distinct similarity metrics (as shown by element 312 FIG. 3): data structure name similarity (e.g., table names), data field name similarity (e.g., column names), and data field content similarity based on the irreversibly hashed data values. The system can determine a weighted average of these three metrics, where column content similarity typically accounts for 70% of the total similarity score, column name similarity accounts for 20%, and table name similarity accounts for 10%. The statistical comparison can utilize multiple techniques including Jaccard Similarity and k-nearest neighbors (k-NN) performed by the AI system 700 illustrated and described in more detail with reference to FIG. 7. For numeric fields, the system can compare the discrete probability distributions generated during the hashing process. The comparison process avoids pairwise comparisons between columns to maintain scalability, instead utilizing vectorized storage and lookup methods that enable efficient processing of instances with hundreds of thousands of columns. The system can determine whether the tables are similar enough by comparing the weighted average similarity score against a configurable threshold value.

In implementations, the computer system processes a limited subset of columns from each table to maintain computational efficiency. The system performs sampling at both the row and column levels, where column sampling helps ensure the number of columns processed remains below a configured threshold. When sampling from tables, the system can select a portion of columns that range between 70 and 90 percent of the original table's columns. This column-level threshold approach enables the system to efficiently process and compare large database instances that may contain hundreds of thousands of columns while maintaining accuracy in similarity detection. The threshold limitation on column processing helps optimize computational resources and processing time by avoiding exhaustive pairwise comparisons between columns, instead utilizing vectorized storage and lookup methods for scalable performance.

In implementations, the computer system generates statistical properties from the irreversibly hashed data of both the first and second tables to enable efficient similarity comparisons. For string and categorical data hashed using MinHash, the system generates statistical properties that estimate how similar two sets of data are. For integer data processed through HashingTF, the system generates discrete probability distributions where the bins contain encrypted values and normalized distribution values, as shown by FIG. 2. For floating point values processed through KLL Sketch, the system generates approximate quantile sketches of continuous distributions. These statistical properties enable the system to perform efficient comparisons between columns without requiring exhaustive pairwise comparisons of the raw data values. The system can use these generated statistical properties to determine similarity through techniques like Jaccard Similarity for string data and k-nearest neighbors for numeric data, while maintaining data privacy since only the statistical properties of the irreversibly hashed data are compared.

In implementations, the computer system performs the statistical comparison of tables using the artificial intelligence (AI) system 700 shown by FIG. 7. The AI system 700 can include multiple machine learning components such as k-nearest neighbors (k-NN) algorithms, MinHash techniques, KLL sketches, and HashingTF transformations that enable reduction of memory footprint and improvement in computational performance. The AI system architecture includes multiple layers-a data layer for preparing data, a structure layer containing the machine learning framework and algorithms, a model layer implementing decision-making capabilities, and an application layer that executes the similarity comparisons. The system employs supervised learning techniques like classification and regression, as well as unsupervised learning methods for pattern detection. The AI system 700 can be trained using labeled data to improve accuracy in detecting similar tables, with the ability to incorporate user feedback for rapid algorithmic improvements. The AI system 700 can utilize artificial neural networks and other machine learning models to process the statistical properties of the hashed data and determine similarities between tables.

At 620, the computer system displays, on a graphical user interface (e.g., as shown by FIG. 3), an indication of the similarity between the first table and the second table. The similarity indication can include a similarity score that represents a weighted average of three metrics: table name similarity (10%), column name similarity (20%), and column content similarity (70%). The similarity score ranges from 0 (least similar) to 1 (most similar). The graphical user interface can display additional information about the tables, such as their data quality status, usage metrics across the enterprise, and connectivity in the data intelligence graph. For enhanced usability, the interface presents the similarity score as a percentage and may include visual indicators like progress bars or charts. The system can also display comparative information between the tables, allowing users to analyze the specific matching columns and content that contributed to the similarity score. The interface enables users to interact with the similarity results and drill down into the specific attributes that determined the similarity between the tables.

In implementations, the computer system determines whether the similarity between the first and second tables exceeds a threshold similarity value. The threshold can be configured but typically ranges from 0.7 to 0.9 on a scale of 0-1 (or 70-90%). When the weighted average similarity score exceeds this threshold, the system identifies the tables as being significantly similar or potential duplicates. The graphical user interface then displays identifying information about both tables, which can include the table names, their data quality status, usage metrics across the enterprise, and their connectivity in the data intelligence graph. The interface allows users to view detailed information about the matching tables, including specific attributes and content similarities that contributed to exceeding the threshold. This display enables data stewards and analysts to make informed decisions about potential duplicate or similar data structures within their systems.

In implementations, the instance of the database is stored on a datacenter, where datacenters are responsible for approximately 2% of the country's electricity use and globally account for approximately 200 terawatt Hours (TWh). The computer system determines whether the similarity between the first and second tables exceeds a configured threshold similarity value, typically ranging from 0.7 to 0.9 on a scale of 0-1. When the similarity exceeds the threshold, the system can identify the second table as a duplicate that can be removed. The system deletes the second table from the database instance to reduce the stored data volume. This reduction in stored data directly reduces the datacenter's power consumption, as transferring 1 GB of data can produce approximately 3 kg of $CO^2$ and storing 100 GB of data in the cloud every year produces approximately 0.2 tons of $CO^2$ or other greenhouse gas emissions. The average U.S. power plant expends approximately 500 grams of carbon dioxide for every kWh generated. By removing duplicate data through the deletion of the second table, the system reduces the datacenter's storage requirements and associated power consumption. This reduction in power consumption results in decreased greenhouse gas emissions from power plants supplying electricity to the datacenter, as the storage of redundant data increases operational cloud storage costs and associated carbon emissions. The implementations thus mitigate climate change by reducing and/or preventing additional greenhouse gas emissions into the atmosphere through the reduction of redundant data storage.

FIG. 7 is a block diagram that illustrates an example artificial intelligence (AI) system 700 that can implement aspects of the present technology. The AI system 700 is implemented using components of the example computer system 800 illustrated and described in more detail with reference to FIG. 8. For example, the AI system 700 can be implemented on the processor 802 using instructions 808 programmed in the memory 806 illustrated and described in more detail with reference to FIG. 8. Likewise, implementations of the AI system 700 can include different and/or additional components or be connected in different ways. FIG. 7 illustrates a layered architecture of AI system 700 that can implement the AI models of the system 100 of FIG. 1, in accordance with some implementations of the present technology.

As shown, the AI system 700 can include a set of layers, which conceptually organize elements within an example network topology for the AI system's architecture to implement a particular AI model 730. Generally, an AI model 730 is a computer-executable program implemented by the AI system 700 that analyses data to make predictions. Information can pass through each layer of the AI system 700 to generate outputs for the AI model 730. The layers can include a data layer 702, a structure layer 704, a model layer 706, and an application layer 708. The algorithm 716 of the structure layer 704 and the model structure 720 and model parameters 722 of the model layer 706 together form an example AI model 730. The optimizer 726, loss function engine 724, and regularization engine 728 work to refine and optimize the AI model 730, and the data layer 702 provides resources and support for application of the AI model 730 by the application layer 708.

The data layer 702 acts as the foundation of the AI system 700 by preparing data for the AI model 730. As shown, the data layer 702 can include two sub-layers: a hardware platform 710 (e.g., the computer devices described in more detail with reference to FIG. 1) and one or more software libraries 712. The hardware platform 710 can be designed to perform operations for the AI model 730 and include computing resources for storage, memory, logic and networking, such as the resources described in relation to FIG. 8. The hardware platform 710 can process amounts of data using one or more servers. The servers can perform backend operations such as matrix calculations, parallel calculations, machine learning (ML) training, and the like. Examples of servers used by the hardware platform 710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 710 can include computing resources, (e.g., servers, memory, etc.) offered by a cloud services provider. The hardware platform 710 can also include computer memory for storing data about the AI model 730, application of the AI model 730, and training data for the AI model 730. The computer memory can be a form of random-access memory (RAM), such as dynamic RAM, static RAM, and non-volatile RAM.

The software libraries 712 can be thought of suites of data and programming code, including executables, used to control the computing resources of the hardware platform 710. The programming code can include low-level primitives (e.g., fundamental language elements) that form the foundation of one or more low-level programming languages, such that servers of the hardware platform 710 can use the low-level primitives to carry out specific operations. The low-level programming languages do not require much, if any, abstraction from a computing resource's instruction set architecture, allowing them to run quickly with a small memory footprint. Examples of software libraries 712 that can be included in the AI system 700 include INTEL Math Kernel Library, NVIDIA cuDNN, EIGEN, and OpenBLAS.

The structure layer 704 can include an ML framework 714 and an algorithm 716. The ML framework 714 can be thought of as an interface, library, or tool that allows users to build and deploy the AI model 730. The ML framework 714 can include an open-source library, an application programming interface (API), a gradient-boosting library, an ensemble method, and/or a deep learning toolkit that work with the layers of the AI system facilitate development of the AI model 730. For example, the ML framework 714 can distribute processes for application or training of the AI model 730 across multiple resources in the hardware platform 710. The ML framework 714 can also include a set of pre-built components that have the functionality to implement and train the AI model 730 and allow users to use pre-built functions and classes to construct and train the AI model 730. Thus, the ML framework 714 can be used to facilitate data engineering, development, hyperparameter tuning, testing, and training for the AI model 730. Examples of ML frameworks 714 that can be used in the AI system 700 include TENSORFLOW, PYTORCH, SCIKIT-LEARN, KERAS, LightGBM, RANDOM FOREST, and AMAZON WEB SERVICES.

The algorithm 716 can be an organized set of computer-executable operations used to generate output data from a set of input data and can be described using pseudocode. The algorithm 716 can include complex code that allows the computing resources to learn from new input data (e.g., the data instances described in more detail with reference to FIGS. 4-6) and create new/modified outputs based on what was learned. In some implementations, the algorithm 716 can build the AI model 730 through being trained while running computing resources of the hardware platform 710. This training allows the algorithm 716 to make predictions or decisions without being explicitly programmed to do so. Once trained, the algorithm 716 can run at the computing resources as part of the AI model 730 to make predictions or decisions, improve computing resource performance, or perform tasks. The algorithm 716 can be trained using supervised learning, unsupervised learning, semi-supervised learning, and/or reinforcement learning.

Using supervised learning, the algorithm 716 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected from various source computing systems described in relation to FIG. 1. Furthermore, training data can include pre-processed data generated by various engines of the system 100 described in relation to FIG. 1. The user may label the training data based on one or more classes and trains the AI model 730 by inputting the training data to the algorithm 716. The algorithm determines how to label the new data based on the labeled training data. The user can facilitate collection, labeling, and/or input via the ML framework 714. In some instances, the user may convert the training data to a set of feature vectors for input to the algorithm 716. Once trained, the user can test the algorithm 716 on new data to determine if the algorithm 716 is predicting accurate labels for the new data. For example, the user can use cross-validation methods to test the accuracy of the algorithm 716 and retrain the algorithm 716 on new training data if the results of the cross-validation are below an accuracy threshold.

Supervised learning can involve classification and/or regression. Classification techniques involve teaching the algorithm 716 to identify a category of new observations based on training data and are used when input data for the algorithm 716 is discrete. Said differently, when learning through classification techniques, the algorithm 716 receives training data labeled with categories (e.g., classes) and determines how features observed in the training data (e.g., text, numbers, strings) relate to the categories. Once trained, the algorithm 716 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 716 is continuous. Regression techniques can be used to train the algorithm 716 to predict or forecast relationships between variables. To train the algorithm 716 using regression techniques, a user can select a regression method for estimating the parameters of the model. The user collects and labels training data that is input to the algorithm 716 such that the algorithm 716 is trained to understand the relationship between data features and the dependent variable(s). Once trained, the algorithm 716 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based preprocessing operations.

Under unsupervised learning, the algorithm 716 learns patterns from unlabeled training data. In particular, the algorithm 716 is trained to learn hidden patterns and insights of input data, which can be used for data exploration or for generating new data. Here, the algorithm 716 does not have a predefined output, unlike the labels output when the algorithm 716 is trained using supervised learning. Said another way, unsupervised learning is used to train the algorithm 716 to find an underlying structure of a set of data, group the data according to similarities, and represent that set of data in a compressed format. The computer system 100 can use unsupervised learning to identify patterns in digital content history (e.g., to identify particular string sequences) and so forth. In some implementations, performance of the system 100 that can use unsupervised learning is improved because the incoming data from a client is pre-processed and reduced, based on the relevant context, as described herein.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 716 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 716 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of training on the latent variables and that the observable variables have nothing in common after controlling for the latent variables. Examples of latent variable techniques that may be used by the algorithm 716 include factor analysis, item response theory, latent profile analysis, and latent class analysis.

The model layer 706 implements the AI model 730 using data from the data layer and the algorithm 716 and ML framework 714 from the structure layer 704, thus enabling decision-making capabilities of the AI system 700. The model layer 706 includes a model structure 720, model parameters 722, a loss function engine 724, an optimizer 726, and a regularization engine 728.

The model structure 720 describes the architecture of the AI model 730 of the AI system 700. The model structure 720 defines the complexity of the pattern/relationship that the AI model 730 expresses. Examples of structures that can be used as the model structure 720 include decision trees, support vector machines, regression analyses, Bayesian networks, Gaussian processes, genetic algorithms, and artificial neural networks (or, simply, neural networks). The model structure 720 can include a number of structure layers, a number of nodes (or neurons) at each structure layer, and activation functions of each node. Each node's activation function defines how a node converts data received to data output. The structure layers may include an input layer of nodes that receive input data, an output layer of nodes that produce output data. The model structure 720 may include one or more hidden layers of nodes between the input and output layers. The model structure 720 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 722 represent the relationships learned during training and can be used to make predictions and decisions based on input data. The model parameters 722 can weight and bias the nodes and connections of the model structure 720. For instance, when the model structure 720 is a neural network, the model parameters 722 can weight and bias the nodes in each layer of the neural networks, such that the weights determine the strength of the nodes and the biases determine the thresholds for the activation functions of each node. The model parameters 722, in conjunction with the activation functions of the nodes, determine how input data is transformed into desired outputs. The model parameters 722 can be determined and/or altered during training of the algorithm 716.

The loss function engine 724 can determine a loss function, which is a metric used to evaluate the AI model's performance during training. For instance, the loss function engine 724 can measure the difference between a predicted output of the AI model 730 and the actual output of the AI model 730 and is used to guide optimization of the AI model 730 during training to minimize the loss function. The loss function may be presented via the ML framework 714, such that a user can determine whether to retrain or otherwise alter the algorithm 716 if the loss function is over a threshold. In some instances, the algorithm 716 can be retrained automatically if the loss function is greater than the threshold. Examples of loss functions include a binary-cross entropy function, hinge loss function, regression loss function (e.g., mean square error, or quadratic loss), mean absolute error function, smooth mean absolute error function, log-cos h loss function, and quantile loss function.

The optimizer 726 adjusts the model parameters 722 to minimize the loss function during training of the algorithm 716. In other words, the optimizer 726 uses the loss function generated by the loss function engine 724 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 726 used may be determined based on the type of model structure 720 and the size of data and the computing resources available in the data layer 702.

The regularization engine 728 executes regularization operations. Regularization is a technique that prevents over- and under-fitting of the AI model 730. Overfitting occurs when the algorithm 716 is overly complex and too adapted to the training data, which can result in poor performance of the AI model 730. Underfitting occurs when the algorithm 716 is unable to recognize even basic patterns from the training data such that it cannot perform well on training data or on validation data. The optimizer 726 can apply one or more regularization techniques to fit the algorithm 716 to the training data properly, which helps constraint the resulting AI model 730 and improves its ability for generalized application. Examples of regularization techniques include lasso (L1) regularization, ridge (L2) regularization, and elastic (L1 and L2 regularization).

The application layer 708 describes how the AI system 700 is used to solve problem or perform tasks. In an example implementation, the application layer 708 statistically compares one or more columns of a first table with one or more columns of a second table to determine a similarity between the first table and the second table.

Figure 8:
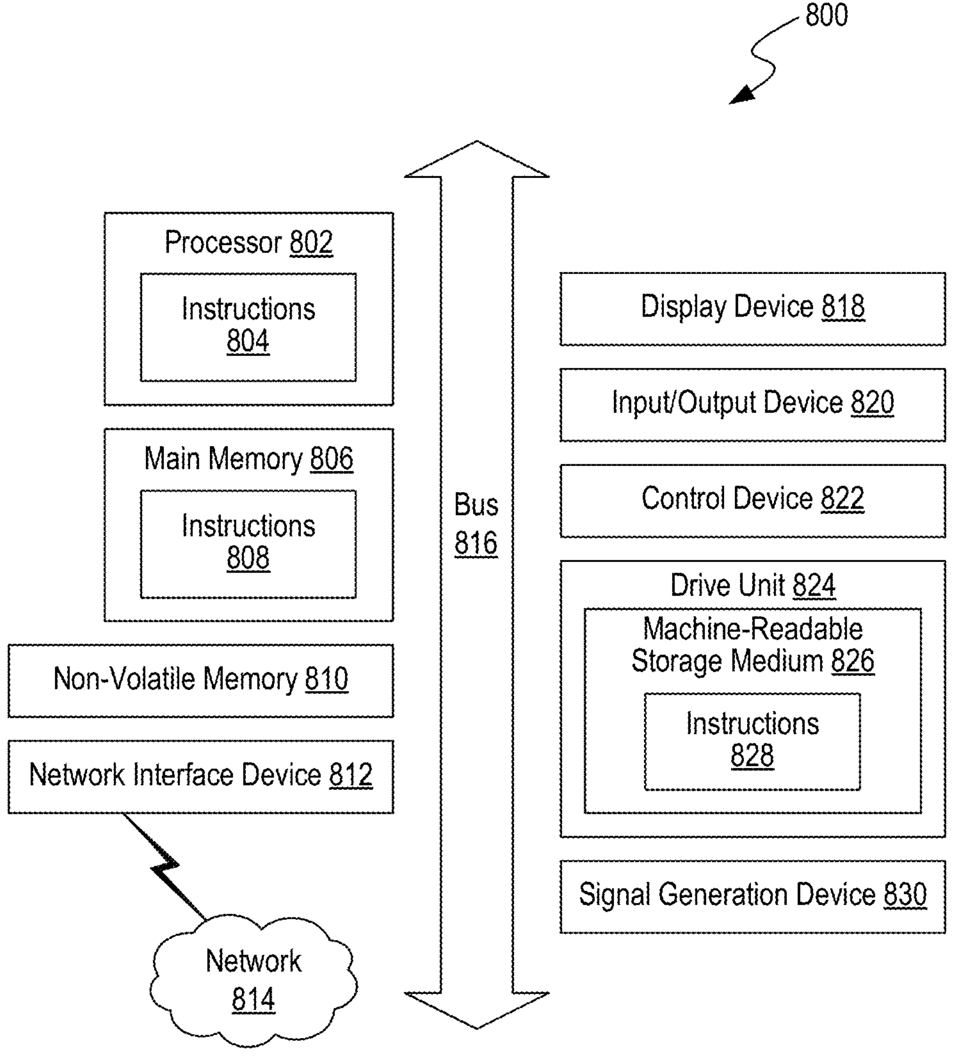
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementation, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computer system 800 to mediate data in a network 814 with an entity that is external to the computer system 800 through any communication protocol supported by the computer system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computer system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

REMARKS

The terms "example," "embodiment," and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the embodiments. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the embodiments, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the embodiments disclosed herein should not be taken to imply that the terminology is being redefined herein to be restricted to any specific characteristics, features, or aspects of the embodiments disclosed herein with which that terminology is associated. In general, the terms used in the following examples should not be construed to limit the embodiments disclosed herein to the specific examples disclosed herein, unless the above Detailed Description explicitly defines such terms. Accordingly, the actual scope of the embodiments disclosed herein encompasses not only the disclosed examples, but also all equivalent ways of practicing or implementing the embodiments disclosed herein under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the embodiments disclosed herein can be modified to employ the systems, functions, and concepts of the various references described above to provide yet further implementations of the embodiments disclosed herein.

To reduce the number of examples, certain implementations are presented below in certain forms, but the applicant contemplates various aspects of the embodiments disclosed herein in other forms. For example, aspects of an example can be recited in a means-plus-function form or in other forms, such as being embodied in a computer-readable medium. An example intended to be interpreted as a mean-plus-function example will use the words "means for." However, the use of the term "for" in any other context is not intended to invoke a similar interpretation. The applicant reserves the right to pursue such additional example forms in either this application or in a continuing application.

We claim:

1. A computer-implemented method comprising:
ingesting, by a computer system, a data instance organized in accordance with multiple data structures,
wherein the multiple data structures include multiple data fields, and
wherein the data instance includes multiple data values stored within the multiple data fields;
irreversibly hashing the multiple data values stored within the multiple data fields to generate hashed data;
determining a data structure name similarity between a first data structure and a second data structure of the multiple data structures;
determining a data field name similarity between the first data structure and the second data structure based on the multiple data fields;
determining a data field similarity between the first data structure and the second data structure based on the irreversibly hashed multiple data values;
determining that a weighted average of the data structure name similarity, the data field name similarity, and the data field similarity is greater than a threshold data similarity;
determining, based on the weighted average being greater than the threshold data similarity, that the second data structure is a duplicate of the first data structure;
removing the second data structure from the hashed data to generate reduced hashed data,
wherein storing the reduced hashed data reduces data storage compared to storing the hashed data; and
sending, to a computer device, information indicating that the second data structure is a duplicate of the first data structure.

2. The computer-implemented method of claim 1, wherein irreversibly hashing the multiple data values is performed using a MinHash algorithm.

3. The computer-implemented method of claim 1, wherein irreversibly hashing the multiple data values is performed using a Locality Sensitive Hashing (LSH) index.

4. The computer-implemented method of claim 1, wherein irreversibly hashing the multiple data values is performed using HashingTF to produce a discrete probability distribution.

5. The computer-implemented method of claim 1, wherein irreversibly hashing the multiple data values is performed using KLL Sketch.

6. The computer-implemented method of claim 1, wherein each of the multiple data structures is a table.

7. The computer-implemented method of claim 1, wherein each of the multiple data fields is a column.

8. At least one non-transitory computer-readable storage medium storing instructions, which, when executed by at least one data processor of a computer system, cause the computer system to:
ingest, from at least one computer device, multiple data values;
irreversibly hash the multiple data values to generate hashed data,
wherein the hashed data is organized in accordance with multiple data structures, and
wherein the multiple data structures include multiple data fields storing the hashed data;
receive, from a computer device, a query identifying a first data structure of the multiple data structures;
in response to receiving the query, identify at least one second data structure of the multiple data structures by performing steps to:
determine a data structure name similarity between the first data structure and the at least one second data structure;
determine a data field name similarity between the first data structure and the at least one second data structure based on the multiple data fields; and
determine a data field similarity between the first data structure and the at least one second data structure based on the irreversibly hashed multiple data values,
wherein a weighted average of the data structure name similarity, the data field name similarity, and the data field similarity is greater than a threshold data similarity;
determine, based on the weighted average being greater than the threshold data similarity, that the at least one second data structure is a duplicate of the first data structure;
remove the at least one second data structure from the hashed data to generate reduced hashed data,
wherein storing the reduced hashed data reduces data storage compared to storing the hashed data; and
display, on a graphical user interface of the computer system, information describing the at least one second data structure.

9. The non-transitory computer-readable storage medium of claim 8, wherein the instructions cause the computer system to:
store the hashed data within a vector store for identifying the at least one second data structure.

10. The non-transitory computer-readable storage medium of claim 8, wherein the instructions cause the computer system to:
profile the multiple data values prior to irreversibly hashing the multiple data values.

11. The non-transitory computer-readable storage medium of claim 8, wherein the instructions cause the computer system to:
determine the data structure name similarity using an Ngram tokenizer.

12. The non-transitory computer-readable storage medium of claim 8, wherein the instructions cause the computer system to:
determine the data field similarity using Jaccard Similarity.

13. The non-transitory computer-readable storage medium of claim 8, wherein the instructions cause the computer system to:
determine the data field similarity using k-nearest neighbors.

14. A computer-implemented method comprising:
receiving, by a computer system, an instance of a database including at least a first table and a second table, wherein the first table includes multiple first rows and multiple first columns, and wherein the second table includes multiple second rows and multiple second columns;
irreversibly hashing first data stored in one or more of the first rows and one or more of the first columns to generate first hashed data;

irreversibly hashing second data stored in one or more of the second rows and one or more of the second columns to generate second hashed data;

statistically comparing, using the first hashed data and the second hashed data, the one or more of the first columns with the one or more of the second columns to determine a similarity between the first table and the second table;

determining, based on the similarity, that the second table is a duplicate of the first table;

deleting the second hashed data to generate reduced hashed data, wherein storing the reduced hashed data reduces data storage compared to storing the first hashed data and the second hashed data; and displaying, on a graphical user interface, an indication of the similarity between the first table and the second table.

15. The computer-implemented method of claim 14, comprising:

determining that the similarity between the first table and the second table is greater than a threshold similarity; and displaying, on the graphical user interface, information identifying the first table and the second table.

16. The computer-implemented method of claim 14, wherein the one or more of the first rows and the one or more of the second rows each include less than a threshold number of rows.

17. The computer-implemented method of claim 14, wherein the one or more of the first columns and the one or more of the second columns each include less than a threshold number of columns.

18. The computer-implemented method of claim 14, comprising generating statistical properties of the first hashed data and the second hashed data for the statistically comparing.

19. The computer-implemented method of claim 14, wherein the statistically comparing is performed using an artificial intelligence (AI) system.

20. The computer-implemented method of claim 14, wherein the instance of the database is stored on a datacenter, wherein the datacenter stores an amount of data, wherein an amount of greenhouses gases emitted by a power plant to supply an amount of electricity to power the datacenter reduces as the amount of data stored reduces, and wherein the computer-implemented method comprises:

determining that the similarity between the first table and the second table is greater than a threshold similarity;

deleting the second table from the instance of the database to reduce the amount of data stored, wherein reducing the amount of data stored is associated with a reduced amount of electricity to power the datacenter; and responsive to deleting the second table from the instance of the database, reducing the amount of greenhouses gases emitted by the power plant to supply the reduced amount of electricity to power the datacenter.

* * * * *